United States Patent [19]

Koiwai et al.

[11] Patent Number: 5,777,802
[45] Date of Patent: Jul. 7, 1998

[54] LENS BARREL WITH A CAM MECHANISM COMPRISED OF PLASTIC MATERIAL

[75] Inventors: Tamotsu Koiwai, Akiruno; Mitsuhiro Sato, Hachioji, both of Japan

[73] Assignee: Olympus Optical Co., Ltd., Tokyo, Japan

[21] Appl. No.: 787,239

[22] Filed: Jan. 22, 1997

[30] Foreign Application Priority Data

Jan. 24, 1996 [JP] Japan ................... 8-010310

[51] Int. Cl.$^6$ ................... G02B 15/14
[52] U.S. Cl. ................... 359/700; 359/704
[58] Field of Search ................... 359/699, 700, 359/823, 819, 704

[56] References Cited

U.S. PATENT DOCUMENTS

| | | | |
|---|---|---|---|
| 5,210,644 | 5/1993 | Nomura | 359/694 |
| 5,216,549 | 6/1993 | Natagashira et al. | 359/703 |
| 5,221,993 | 6/1993 | Nomura | 359/601 |
| 5,225,124 | 7/1993 | Sorathia et al. | 264/45.3 |
| 5,225,938 | 7/1993 | Nomura | 359/699 |
| 5,613,170 | 3/1997 | Takamura et al. | 396/435 |

FOREIGN PATENT DOCUMENTS 5-34558  2/1993  Japan.

Primary Examiner—Georgia Y. Epps
Assistant Examiner—Ricky Mack
Attorney, Agent, or Firm—Louis Weinstein

[57] ABSTRACT

A lens barrel with a cam mechanism, manufactured by molding plastic, comprising a plurality of cams having a plurality of parting lines, for lens driving, and a plurality of cam followers that are engaged with the plurality of cam faces of the respective cams. The plurality of parting lines are arranged on the plurality of cam followers in a manner that the positions of the parting lines relative to the respective cam followers are set to be different from each other. In the driving of lenses, no two cam followers are simultaneously positioned at their respective parting lines so that the lenses may be free from the effect of a step at each parting line. Thus, the deviation of the position of each lens is minimized.

11 Claims, 5 Drawing Sheets

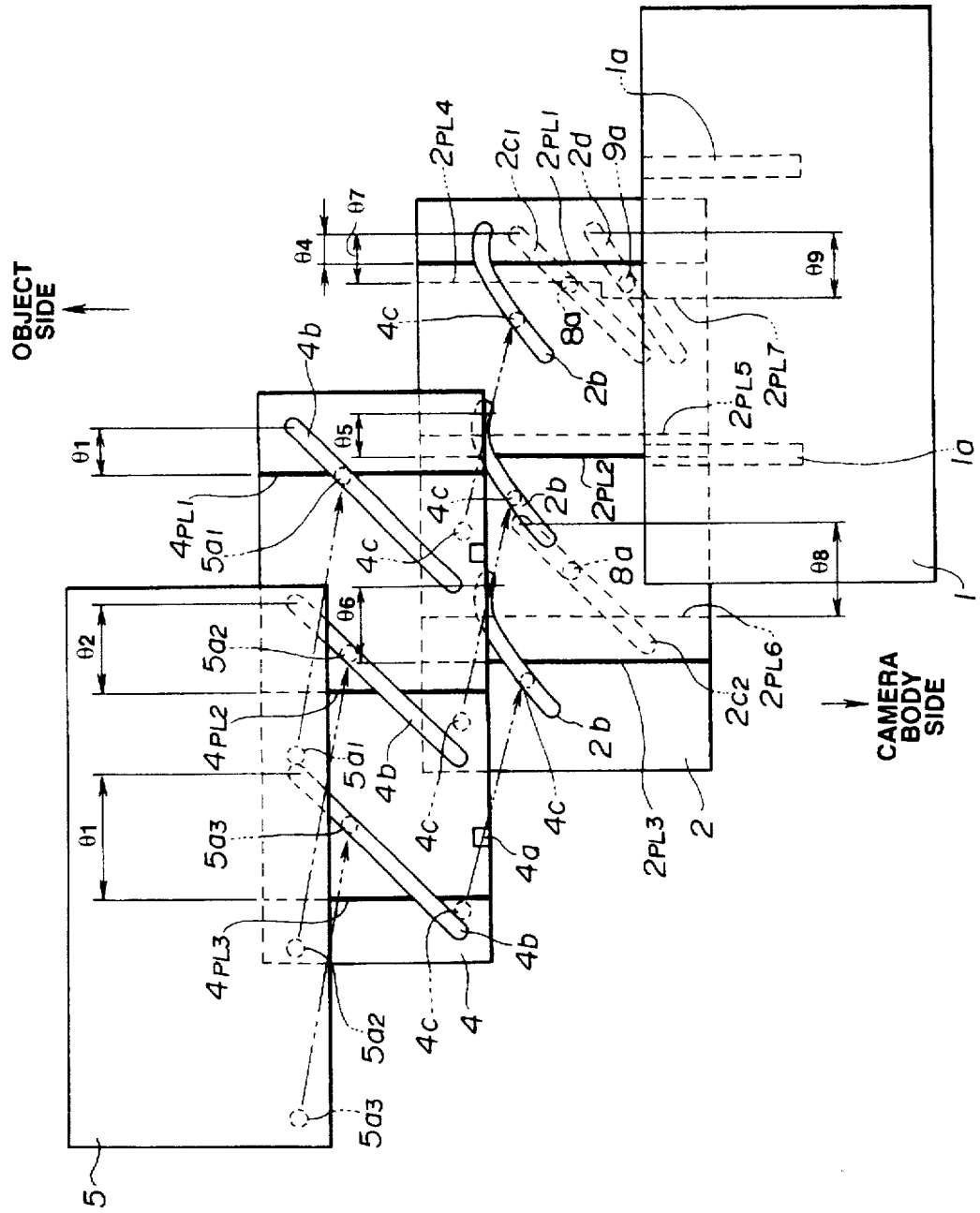

LENS BARREL WITH A CAM MECHANISM COMPRISED OF PLASTIC MATERIAL

BACKGROUND OF THE INVENTION

1. Field of the Invention

The present invention relates to a lens barrel with a cam mechanism.

2. Description of the Related Art

Japanese Unexamined Patent Publication No. 5-34558 proposes a cam mechanism for driving a lens in a lens barrel. The disclosure proposes one device that is driven and controlled so that a cam pin is prevented from stopping at a parting line that is generated in a molding process on the cam face of the cam mechanism for driving a lens support frame. With the device thus controlled, the position of the focal plane of the lens is maintained fixed.

If the device disclosed in Japanese Unexamined Patent Publication No. 5-34558 is incorporated in a zoom camera capable of an arbitrary framing action, the device is controlled such that a cam pin may not stop at a parting line; thus, it is difficult to stop a lens at an arbitrarily projected position, namely at a photographer's intended zoom position. Furthermore, since the backlash in the direction of the rotation of a cam ring becomes different depending upon the zooming direction of the lens, it will be difficult to reliably avoid the parting line position.

OBJECT AND SUMMARY OF THE INVENTION

Accordingly, it is an object of the present invention to provide a cam mechanism of a lens barrel that controls the position deviation of a lens group to a minimum without any effect of a step at a parting line on the lens group.

The lens barrel with a cam mechanism of the present invention comprises a first lens having a first cam follower, a movable frame that is formed by molding plastic, having a first cam groove engaged with the first cam follower, a second lens having a second cam follower, a cam ring that is formed by molding plastic, having a second cam groove engaged with the second cam follower, and a third cam follower formed on one of the movable frame and the cam ring and a third cam groove formed on the other of the movable frame and the cam ring, the third cam groove engaged with the third cam follower, wherein the cam faces of at least two cam grooves of the first, second and third cam grooves have discontinuities arising from any of a projection, a dent and a step at the ends of a plurality of parting lines that are generated in the course of a molding process. The plurality of parting lines existing on the cam faces of the cam grooves are arranged such that no plurality of cam followers are simultaneously positioned at the respective parting lines.

In the lens barrel with the above cam mechanism, the plurality of cam followers are not simultaneously positioned on the plurality of parting lines, and the effect of the step, the projection and the dent of the parting lines is reduced. Thus, the position deviations of the cam followers are reduced, and the out-of-focus state of each lens is minimized.

These and other features and advantages will become more apparent when the following detailed description of the invention is considered with the drawings.

BRIEF DESCRIPTION OF THE DRAWINGS

FIG. 7 is a development of the fixed frame, the movable frame, the cam ring and the like in which a modified method of the position setting method of the cam of the lens barrel in the embodiment shown in FIG. 1 is implemented.

DETAILED DESCRIPTION OF THE PREFERRED EMBODIMENT

Figure 1:
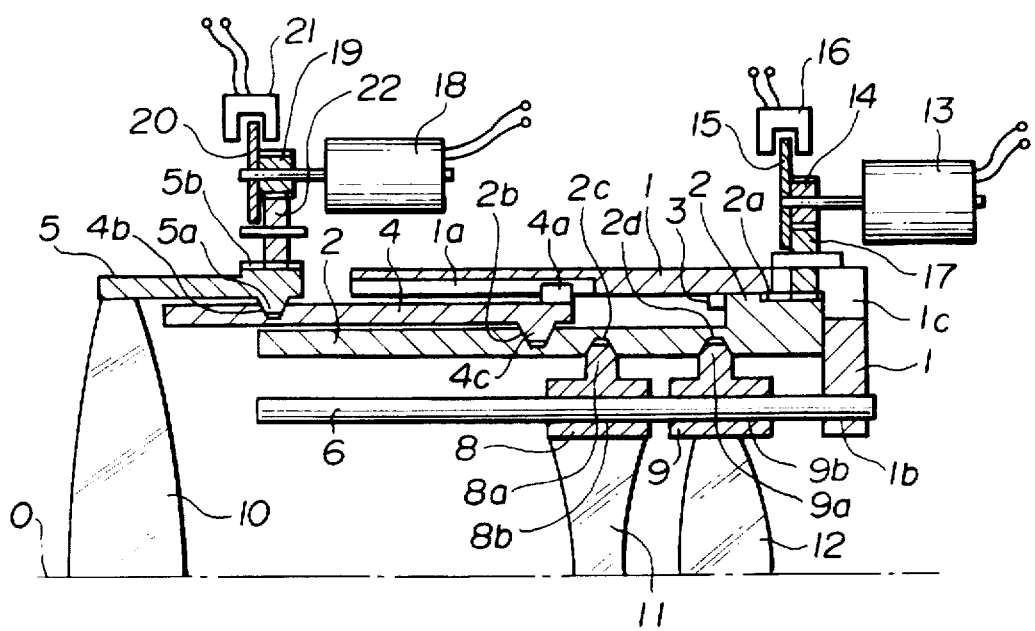
FIG. 1 is a vertical sectional view of a lens barrel housing a cam mechanism according to one embodiment of the present invention.

Referring now to the drawings, embodiments of the present invention are now discussed.

Figure 2:
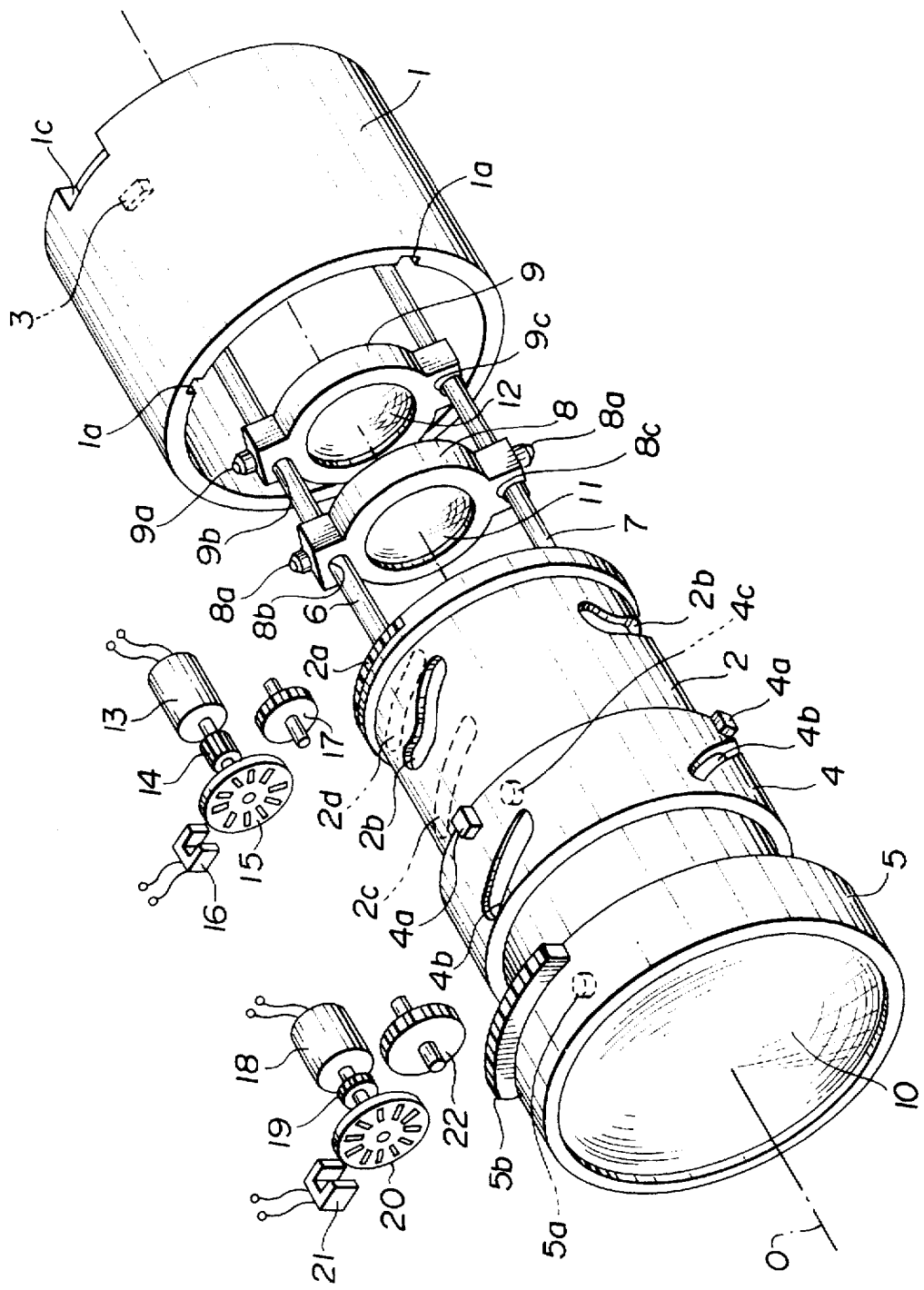
FIG. 2 is an exploded perspective view of the lens barrel of FIG. 1.

FIG. 1 is a vertical sectional view showing the major portion of a lens barrel in which one embodiment of the present invention is incorporated. FIG. 2 is an exploded perspective view of the lens barrel. A camera body, and fixed sections for a focus driving unit and a zoom driving unit are not shown in FIGS. 1 and 2.

The lens barrel comprises a fixed frame 1 attached to the unshown camera body, a cam ring 2 rotatably supported by a stopper 3 inside the fixed frame 1, a movable frame 4 that is supported within the fixed frame 1 in a manner that allows the movable frame 4 to advance and recede in the direction of the optical axis, with a rectilinear key 4a of the movable frame 4 received in a rectilinear groove 1a longitudinally extending in the direction of the optical axis of the fixed frame 1, a first group frame 5 for supporting a first group lens 10 in an optical imaging system, a second group frame 8 for supporting a second group lens 11 in the optical imaging system, a third group frame 9 for supporting a third group lens 12 in the optical imaging system, a zooming motor 13 for zoom driving, and a focusing motor 18 for focus driving.

The fixed frame 1 has an opening portion 1c through which an annular gear portion 2a formed on a part of the circumference of the cam ring 2 as a ring member is driven from the outside. The rear flange portion 1d of the fixed frame 1 has mounting holes 1b in which a first shaft 6 and a second shaft 7 are rigidly received, respectively. The first and second shafts 6, 7 slidably support the second group frame 8 and third group frame 9.

The cam ring 2 has, on its outer circumference, three first zoom cams 2b as cam means in three approximately equally divided arc segments, respectively, around the circumference of the cam ring. First cam followers 4c as follower members that are attached to the inner circumference of the movable frame 4 as a ring member are engaged with the respective first zoom cams 2b. It is not a requirement that the first zoom cams 2b are circumferentially equally spaced. Alternatively, they may be unequally spaced around the circumference of the cam ring 2.

The cam ring 2 has, on its inner circumference, two second zoom cams 2c as cam means for zooming in symmetrical positions, namely 180° angularly spaced cams 2c1 and 2c2, which receive respective second cam followers 8a as follower means formed on the second group frame 8. Also formed in the inner circumference of the cam ring 2 is a third zoom cam 2d, which receives a third cam follower 9a as follower members of the third group frame 9.

The movable frame 4 has, on its outer circumference, three focus cams 4b as focus means in three approximately equally divided arc segments, respectively, around the circumference of the movable frame 4. Focus cam followers 5a as follower members attached to the first group frame 5 are engaged in the respective focus cams 4b. Also, in this case, it is not a requirement that the focus cams 4b are circumferentially equally spaced. Alternatively, they may be unequally spaced around the circumference of the movable frame 4.

The first group lens 10 is rigidly attached to the first group frame 5, which has an annular gear portion 5b on its outer circumference. The annular gear portion 5b has a circumferential length corresponding to the travel of the first group frame 5 in the direction of the optical axis.

The second group frame 8 is slidably supported at its supporting hole 8b by the first shaft 6 that is rigidly secured to the fixed frame 1. The second group frame 8 has a notch 8c diagonally opposite the supporting hole 8b, and the notch 8c receives the second shaft 7. Attached to the second group frame 8 are the second cam followers 8a at two respective positions corresponding to the respective second zoom cams 2c1 and 2c2 of the cam ring 2.

The third group frame 9, arranged behind the second group frame 8 (closer to the camera body side), is supported at its supporting hole 9b by the first shaft 6. The third group frame 9 has a notch 9c diagonally opposite the supporting hole 9b to receive the second shaft 7, and is thus positioned in a secure manner. The third cam follower 9a is attached at one position to the third group frame 9.

A pinion 14 and a toothed disk 15 are rigidly attached to the rotating shaft of the zooming motor 13. The pinion 14 is linked to the annular gear portion 2a of the cam ring 2 via a gear 17. Arranged in the vicinity of the toothed disk 15 is a photo-interrupter PI16 for detecting the angular travel of the rotating shaft of the zooming motor 13.

A pinion 19 and a toothed disk 20 are rigidly attached to the rotating shaft of the focusing motor 18. The pinion 19 is linked to the annular gear portion 5b of the first group frame 5 via a gear 22. Arranged in the vicinity of the toothed disk 20 is a photo-interrupter PI21 for detecting the angular travel of the rotating shaft of the focusing motor 18.

In the above driving systems, the first group frame 5, second group frame 8 and third group frame 9 are driven in focus and zoom drivings by means of the focusing motor 18 and zooming motor 13, respectively.

Figure 3:
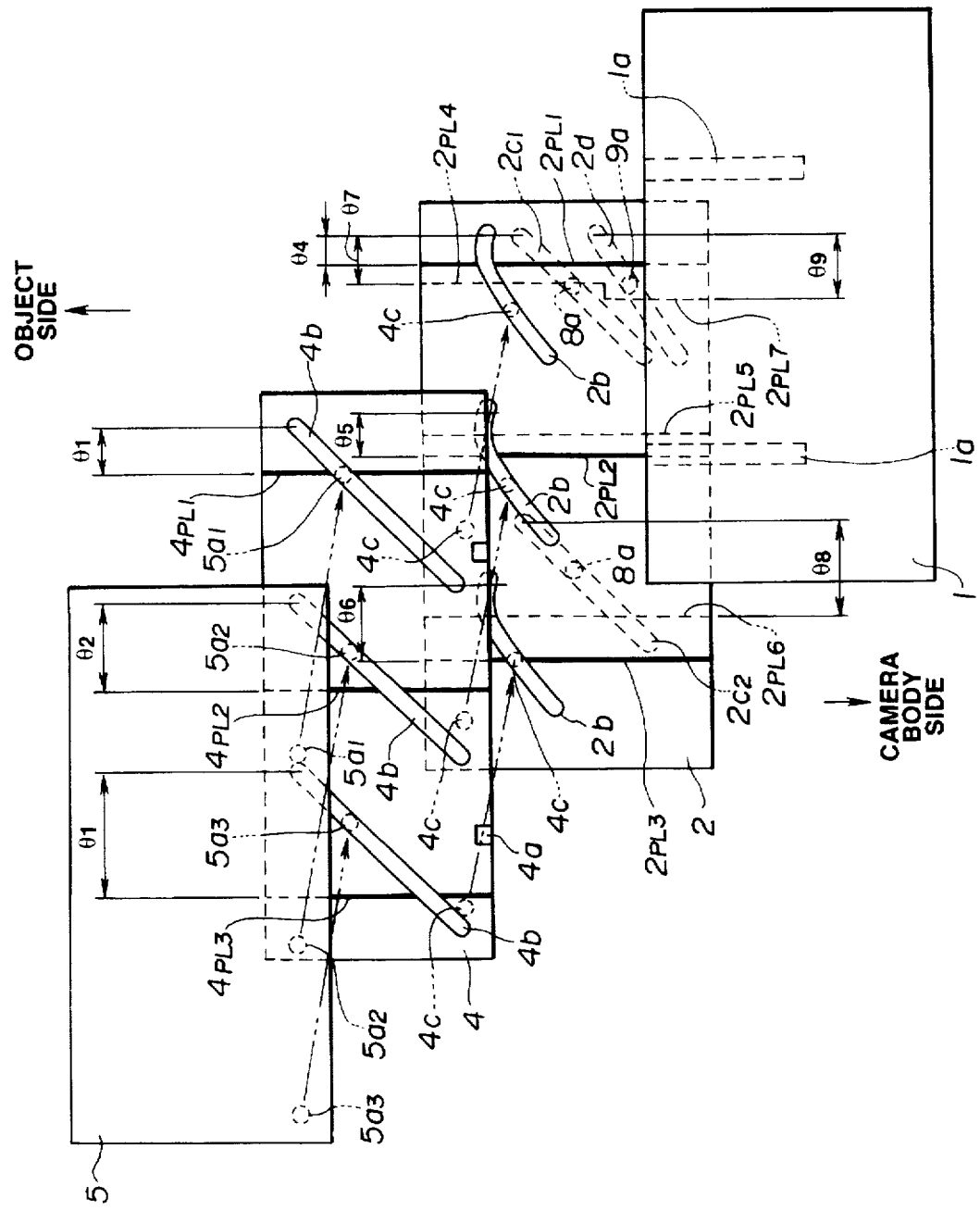
FIG. 3 is a development of a fixed frame, a movable frame, a cam ring and the like incorporated in the lens barrel of FIG. 1.

Referring to the development of the cam ring in FIG. 3, the positional relationship of the cams in the group frames to the parting lines of the respective cam faces is discussed.

The focus driving system is now discussed. The movable frame 4 can slide in the direction of the optical axis only by means of the rectilinear key 4a, and has the three focus cams 4b in three approximately equally divided arc segments of its outer circumference, respectively.

In the molding process of the movable frame 4, each mold is radially shifted from the portion of the molding compound which is to be formed as the circumference of the movable frame 4. To this end, the molds are parted at longitudinal lines along the axis of the movable frame 4. The opening surfaces of the molds become an interface line, namely a parting line on a finished frame 4. In this lens barrel, the molds are three circumferentially split, radially sliding type ones.

Referring to FIG. 3, the positions where the parting lines cross the respective focus cams 4b on the movable frame 4 are at angles θ1, θ2 and θ3 relative to the ends of the respective focus cams 4b, and are designed to be different relative to respective reference positions. Namely, angles θ1, θ2 and θ3 are different from each other.

The reference positions above or the reference positions to be described later are, for example, the positions of the cam followers on the focus cams or the zoom cams when the group frames are at their initial driving positions at the start of the lens barrel driving.

The first group frame 5 to which the first group lens 10 contributing to the focusing operation is rigidly attached has, on its inner circumference, the three circumferentially equally spaced focus cam followers 5a corresponding to the focus cams 4b of the movable frame 4. As shown in FIG. 3, the three focus cam followers 5a are designated reference numerals 5a1, 5a2 and 5a3.

The zoom driving system for the first group lens 10 is now discussed. As already described, the cam ring 2 has, on its outer circumference, the three first zoom cams 2b in three approximately equally divided arc segments, respectively, around the circumference of the cam ring 2 to zoom drive the first group lens 10. The cam ring 2 inevitably has parting lines generated in the course of a molding process.

Suppose that three circumferentially split, radially sliding type molds are now used. As shown in the development in FIG. 3, the positions where three parting lines 2PL1, 2PL2, and 2PL3 cross the respective first zoom cams 2b on the outer circumference of the cam ring 2 are at angles θ4, θ5 and θ6 relative to the ends of the respective zoom cams 2b. The angles θ4, θ5 and θ6 are different from each other.

The three first cam followers 4c circumferentially equally spaced are attached to the inner circumference of the movable frame 4 so that they are engaged with the respective three first zoom cams 2b (as shown in the development in FIG. 3).

The zoom driving system for the second group lens 11 is now discussed.

The cam ring 2 has, on its inner circumference, the two second zoom cams 2c1 and 2c2 to cause the second group lens 11 to perform a desired zooming operation. One second zoom cam 2c1 of the two is arranged in the same angular position as one of the first zoom cams 2b on the outer circumference of the cam ring 2, and the other second zoom cam 2c2 is 180° angularly shifted from the second zoom cam 2c1 (as shown in the development in FIG. 3).

The inner circumference of the cam ring 2 is formed using three circumferentially split, sliding type molds allowed to shift toward the optical axis. One parting line 2PL4 of three parting lines is positioned at an angle of θ7 relative to the end of the second zoom cam 2c1. The parting line 2PL5 is positioned at a midpoint between the two second zoom cams 2c1 and 2c2. The last parting line 2PL6 is positioned at an angle θ8 relative to the end of the second zoom cam 2c2. The angles θ7 and θ8 of the respective parting lines 2PL4 and 2PL6 are different from each other.

The second group frame 8 has two cam followers 8a at positions corresponding to the second zoom cams 2c1 and 2c2 so that the two cam followers 8a are engaged with the respective second zoom cams 2c1 and 2c2.

The zoom driving system for the third group lens 12 is now discussed.

As already described, the cam ring 2 has, on its inner circumference, the third zoom cam 2d to cause the third group lens 12 to perform a desired zooming operation. The third zoom cam 2d is formed in a single position only, and has the same angular position as the second zoom cam 2c. The parting line 2PL7 that crosses the third zoom cam 2d is positioned at an angle θ9 relative to the reference end of the third zoom cam 2d.

The third cam follower 9a is attached to the third group frame 9 at the position corresponding to the third zoom cam 2d, and the third cam follower 9a is engaged with the third cam 2d.

In the first, second and third zoom cams 2b, 2b, and 2d for the respective first, second and third group lenses, the angular positions of the parting lines from their respective reference positions are different from each other, and thus, the angles θ4, θ5, θ6, θ7, θ8 and θ9 are different from each other.

The detail of the shape of each parting line in each cam is now discussed.

Figure 4:
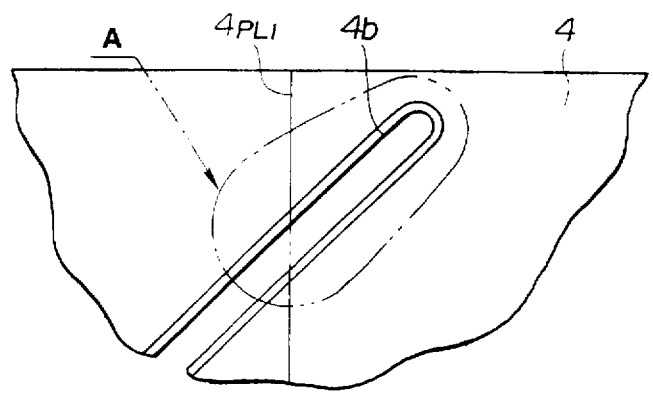
FIG. 4 is a fragmentary plan view showing a focus cam of the movable frame incorporated in the lens barrel of FIG. 1.
Figure 5A:
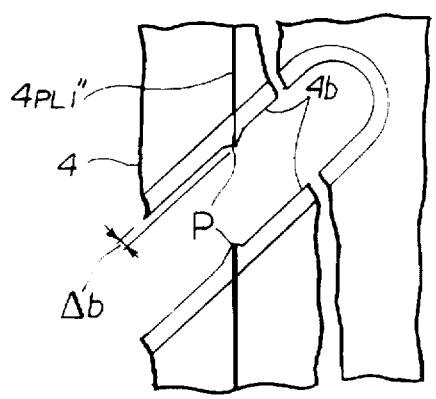
FIG. 5A is an enlarged plan view of an area A in FIG. 4, showing a parting line and its vicinity in the focus cam.
Figure 5B:
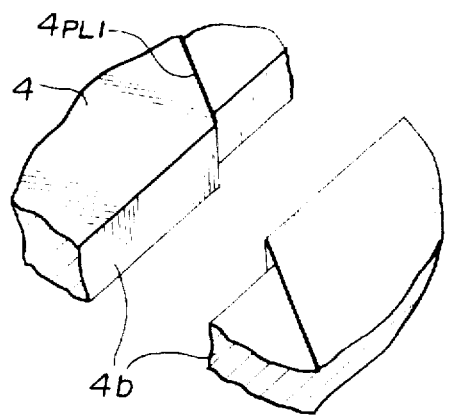
FIG. 5B is an enlarged perspective view of the area A in FIG. 4, showing the parting line and its vicinity in the focus cam.
Figure 6A:
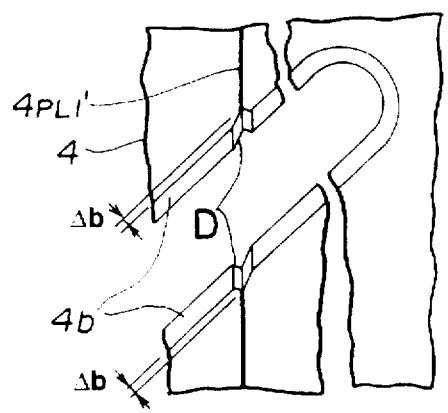
FIG. 6A is an enlarged plan view of the area A in FIG. 4, showing recesses along the parting line in the focus cam.
Figure 6B:
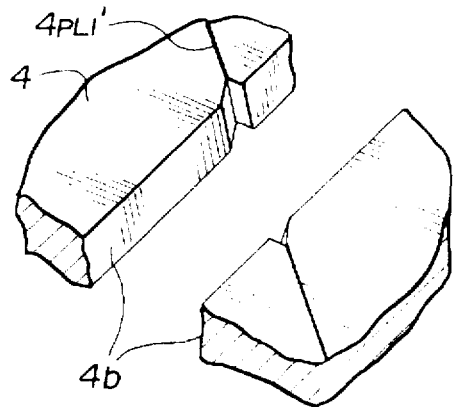
FIG. 6B is an enlarged perspective view of the area in FIG. 4, showing the recesses along the parting line in the focus cam.

FIG. 4 is a plan view showing one of the focus cams 4b of the movable frame 4. FIG. 5A is a fragmentary enlarged plan view of an area A in FIG. 4, and FIG. 5B is an enlarged perspective view of the area A in FIG. 4, showing a parting line 4PL1 crossing the focus cam 4b that takes the form of a step. FIG. 6A is a fragmentary enlarged plan view of the area A in FIG. 4, showing a parting line in the form of a dent, and FIG. 6B is an enlarged perspective view of the area A in FIG. 4, showing the parting line 4PL1' crossing the focus cam 4b.

The step parting line in FIGS. 5A and 5B arises from a step Δb that is generated when the opening surfaces of the split molds slightly shift in the direction of thrust, and the step Δb typically ranges from 0.02 to 0.05 mm. The parting line may take the form of a projection. The dent parting line in FIGS. 6A and 6B is formed to prevent burrs from projecting out of the cam face, and is inevitably associated with a step.

When the parting line is associated with a step, a projection or a dent as described above, the cam follower driven by the cam is moved additionally by the step. In the conventional cam mechanism, for example, if a plurality of cam followers are simultaneously positioned at the respective parting lines, the cam followers are put into an unpredictable driving condition, and the lens group cannot be controlled to their correct positions. In particular, in a zoom lens system, the degree of contribution to the displacement of an image plane is different from lens group to lens group, and one lens group that gives rise to the maximum degree of contribution results in a displacement of the image plane 10 times its own displacement. For example, a displacement of 0.05 mm in a lens group results in a displacement of 0.5 mm in the image plane. This causes an out-of-focus picture to be taken.

In view of the above problem, in the cam mechanism of this embodiment, the parting lines relative to the cams are shifted relative to each other in the travels of the cam followers so that the plurality of cam followers may not simultaneously meet the respective parting lines and so that the displacement of the lens position may thus be prevented. The operation of the cam mechanism is now discussed referring to FIGS. 1 through 3.

The focus operation of the camera is first discussed.

The focusing motor 18 that is driven by a control circuit (not shown) rotates integrally the toothed disk 20 and the pinion 19, which in turn rotates the annular gear portion 5b of the first group frame 5 via the gear 22. The angular travel of the shaft of the motor 18 is detected by the photo-interrupter PI21. When a predetermined angular travel is reached, the control circuit stops the focusing motor 18.

Since the focus cam followers 5a on the inner circumference of the first group frame 5 are engaged with the respective focus cams 4b of the movable frame 4, the rotation of the first group frame 5 moves the first group frame 5 in the direction of the optical axis relative to the movable frame 4.

As shown in FIG. 3, when one focus cam follower 5a1 of the three followers is positioned at or meets the parting line 4PL1 that crosses the focus cam 4b, the remaining two focus cam followers 5a2, 5a3 are off the positions of parting lines 4PL2 and 4PL3, respectively, because angles θ1, θ2 and θ3 are different from each other.

Although the one focus cam follower 5a1 is displaced by the step of the parting line, the remaining two cam followers 5a2 and 5a3 accurately follow the respective focus cams 4b; thus, compared with the conventional cam mechanism where all focus cam followers 5a, namely 5a1, 5a2 and 5a3, meet their respective parting lines, the displacement of the lens group is small, and the adverse effect on the focal plane is minimized.

Furthermore, when the focus cam follower 5a2 happens to meet the parting line 4PL2 or when the focus cam follower 5a3 happens to meet the parting line 4PL3, only a single cam follower, rather than two or more, meets its respective parting line. Thus, the adverse effect of the parting lines on the focal plane is minimized.

The zooming operation of the camera is discussed.

The zooming motor 13 that is driven by a control circuit rotates integrally the toothed disk 15 and the pinion 14, which in turn rotates the annular gear portion 2a of the cam ring 2 via the gear 17. The angular travel of the shaft of the motor 13 is detected by the photo-interrupter PI16. When a predetermined angular travel is reached, the control circuit stops the zooming motor 13. Along with the rotation of the cam ring 2, the first group frame 5 is zoom driven by the movable frame 4 via the first, second and third zoom cams 2b, 2b and 2b, and furthermore, the second group frame 8 and the third group frame 9 are respectively zoom driven by cams 2c, 2c and 2d. Since the first group frame 5 is supported by the movable frame 4, the travel of the movable frame 4 directly translates to a zooming run.

The above zooming operation is now discussed further in detail referring to FIG. 3. The operation of the first group frame 5 is discussed first.

If one of the first cam followers 4c attached onto the movable frame 4 meets the position of the parting line 2PL3 crossing the respective first zoom cam 2b of the cam ring 2, the remaining first cam followers 4c will be off the positions of the respective parting lines 2PL1 and 2PL2. This is because the angles θ1, θ2 and θ3 of the parting lines 2PL1 through 2PL3 on the respective first zoom cams 2b, relative to their respective reference positions are different from each other.

If, with the cam ring rotating further, one of the first cam followers 4c meets the parting line 2PL1 or 2PL2, neither of the other two parting lines will meet the respective first cam followers 4c.

As described above, although a single one of the three cam followers 4c rides over the step or projection or falls in the dent, the remaining cam followers are off the respective parting lines. The first group frame 5 driven through the movable frame 4, namely the first group lens 10 suffers a minimum displacement, with no unpredictable displacement in the image plane.

The operation of the second group frame 8 is now discussed.

Now suppose that the cam ring 2 rotates causing one of the two second cam followers 8a on the second group frame 8 to meet the position of the parting line 2PL4. Since the angles θ8 and θ7 of the respective parting lines 2PL6 and 2PL4 relative to their respective reference positions are different as shown in FIG. 3, the other second cam follower 8a is off the parting line 2PL6. This is interpreted to mean that the displacement of the second group frame 8 due to the step or projection at the parting lines in this embodiment is approximately half the displacement that is experienced when the two cam followers 8a simultaneously ride on the two parting lines 2PL4 and 2PL6, respectively.

When, with the cam ring 2 rotating further causing the other second cam follower 8a to come to the position of the parting line 2PL6, the one second cam follower 8a is off the parting line 2PL4, and the displacement of the second group frame 8 is controlled.

The operation of the third group frame 9 is now discussed.

When the parting line 2PL4 crossing the second zoom cam 2c1 of the cam ring 2 comes to the second cam follower 8a of the second group frame 8 as shown in FIG. 3, the third cam follower 9a at the single position only, of the third group frame 9 is off the respective parting line 2PL7. This is because the angles of θ7, θ8 and θ9 of the parting lines 2PL4, 2PL6 and 2PL7 corresponding to the respective cam followers 8a, 9a, relative to their respective reference positions are different from each other.

The same is true in the first zoom cams 2b and third zoom cam 2d in relation to the first group frame 5. Namely, the angles θ4, θ5, θ6 and θ9 of the respective parting lines 2PL1, 2PL2, 2PL3 of the first zoom cams 2b and 2PL7 of the third zoom cam 2d, relative to their reference positions, are different from each other, and thus two or more cam followers cannot meet simultaneously their respective parting lines.

The same is also true in the first zoom cams 2b and the second zoom cams 2c1 and 2c2 in relation to the first group frame 5.

According to the above embodiment, no plurality of cam followers in the third group frame 9 and the second group frame 8 or in the first group frame 5 ride on the steps or projections of their respective parting lines generated in the course of molding, and the displacements of the lenses are minimized.

A plurality of cams and cam followers are used to drive a single lens group for advancement and recession, and the accuracy of travel of the lenses is improved.

In the above embodiment, the focus cams 4b and the first zoom cams 2b are positioned in three equally divided arc segments around each of the circumferences. As long as the angular relationships of the parting lines with respect to the cams in consideration of the motions of the cam followers are kept from agreeing with each other, the same purpose as described above will be achieved. Other alternative cam arrangement are perfectly acceptable. For example, three parting lines may be arranged at three circumferentially equally spaced positions but with the reference positions of the three respective cams arranged at three unequally spaced positions. Furthermore, both the cams and the parting lines may be arranged at positions shifted from their respective circumferentially equally spaced positions as long the above-described purpose is achieved.

By reducing the number of parting lines in comparison with the number of cam followers, cam followers and parting lines are prevented from meeting each other at two or more positions at any given moment.

In the above embodiment, the following settings (1) and (2) are made independently.

(1) Among the cams 4b of the movable frame 4, the parting lines 4PL1–4PL3 and the cam followers 5a1–5a3, the cam—parting line—cam follower positional relationship is set such that no plurality of cam followers simultaneously meet the parting lines.

(2) Among the cams 2b–2d of the cam ring 2, the parting lines 2PL1–2PL7 and the cam followers 4c, 8a, 9a, the cam—parting line—cam follower positional relationship is set such that no plurality of cam followers simultaneously meet the parting lines.

As shown in FIG. 3, there may be a possibility that when the cam follower 5a1 is positioned at the parting line 4PL1 of the movable frame 4, the cam follower 4c happens to be positioned at the parting line 2PL1 of the cam ring 2. In such a case, a resulting error is reduced compared with the conventional mechanism. To reduce the error even further, however, as shown in the development of the fixed frame, the movable frame, and the cam ring in FIG. 7, their mutual positional relationship is set considering the settings (1) and (2) at the same time so that no plurality of cam followers are positioned at the respective parting lines in view of the plurality of lens groups and the plurality of frames.

What is claimed is:

1. A lens barrel comprising:

a first lens having a first cam follower;

a movable frame that is formed by molding plastic, having a first cam groove engaged with the first cam follower;

a second lens having a second cam follower;

a cam ring that is formed by molding plastic, having a second cam groove engaged with the second cam follower;

a third cam follower formed on one of the movable frame and the cam ring and a third cam groove formed on the other of the movable frame and the cam ring, the third cam groove engaged with the third cam follower, wherein cam faces of at least two cam grooves of the first, second and third cam grooves have discontinuities arising from any of a projection, a dent and a step at ends of a plurality of parting lines that are generated in a molding process and wherein the plurality of parting lines on the cam faces of the cam grooves are arranged such that no two of the cam followers are simultaneously positioned at the respective parting lines.

2. A lens barrel comprising:

a lens support frame for holding a lens;

a cam frame member that is formed by molding plastic, having a plurality of cams for moving the lens, wherein a parting line generated in a molding process exists on a cam face of at least one of the plurality of cams; and a plurality of cam followers that are guided by cam faces of the plurality of cams, wherein the cam followers are formed on one of the lens support frame and a member that supports the lens support frame, and wherein a positional relationship of the plurality of cams to the parting lines is set such that no two followers are simultaneously positioned at the parting lines of the cam faces of the cams.

3. A lens barrel according to claim 2, wherein the plurality of cams are circumferentially equally spaced around the cam frame member while the parting lines are circumferentially unequally spaced.

4. A lens barrel according to claim 2, wherein the plurality of cams circumferentially equally spaced around the cam frame member and the parting lines are also circumferentially equally spaced.

5. A lens barrel comprising:

a lens support frame for holding a lens;

a cam frame member that is formed by molding plastic, having a plurality of cams for moving the lens, wherein a parting line generated in a molding process exists on a cam face of at least one of the plurality of cams; and a plurality of cam followers guided by the cam faces of the plurality of cams, wherein the cam followers are formed on one of the lens support frame and a member that supports the lens support frame, and wherein a positional relationship of the plurality of cam followers to the parting lines is set such that no two of the cam followers are simultaneously positioned at the parting lines of cam faces of the cams.

6. A lens barrel comprising:

a lens support frame for holding a lens;

a cam frame member formed by molding plastic, having a plurality of cams for moving the lens, wherein a parting line generated in a molding process exists on a cam face of at least one of the plurality of cams; and a plurality of cam followers guided by cam faces of the plurality of cams, wherein the cam followers are formed on one of the lens support frame and a member that supports the lens support frame, and wherein a relative positional relationship of the plurality of cams to the parting lines is set such that only one of the cam followers, each engaged with each of the plurality of cams, is positioned at the parting line of the associated cam face over a range of movement of the cam followers.

7. A lens barrel comprising:

a lens frame for supporting a lens;

a ring member that is formed by molding plastic;

the ring member having a plurality of cams for moving the lens, wherein cam faces of the cams have discontinuities arising from any of a projection, a dent and a step at ends of a plurality of parting lines that are generated in a molding process; and a plurality of cam followers that are positioned in accordance with the cam faces when the plurality of cam followers engage the cam faces of the plurality of cams, wherein the cam followers are formed on one of the lens frame an a member for driving the lens frame, and wherein a positional relationship of the plurality of cams to the parting lines is set such that no two cam followers are simultaneously positioned at the parting lines of the cam faces of the cams.

8. A lens barrel comprising:

a lens frame for supporting a lens;

a ring member formed by molding plastic;

the ring member having a plurality of cams for moving the lens, wherein cam faces of the cams have discontinuities arising from any of a projection, a dent and a step at ends of a plurality of parting lines that are generated in a molding process; and a plurality of cam followers positioned in accordance with the cam faces when the plurality of cam followers engage the cam faces of the plurality of cams, wherein the cam followers are formed on a cam frame having a cam for driving the lens frame, and wherein a positional relationship of the plurality of cams to the parting lines is set such that no two of the cam followers are simultaneously positioned at the parting lines of the cam faces of the cams.

9. A lens barrel comprising:

a ring member that is formed by molding plastic;

the ring member having a plurality of cams for moving the lens, cam faces of the cams having discontinuities arising from any of a projection, a dent and a step at ends of a plurality of parting lines that are generated in a molding process; and a plurality of cam followers that are positioned in accordance with the cam faces when the plurality of cam followers engage the cam faces of the plurality of cams, wherein the cam followers are formed on one of the lens frame and a member for driving the lens frame, and wherein the plurality of cams, the plurality of cam followers and the plurality of parting lines are arranged such that no two of the cam followers are simultaneously positioned at the parting lines of the cam faces of the cams.

10. A lens barrel comprising a cam member having a plurality of cams and a plurality of follower members engaged with the plurality of cams, with at least part of an optical imaging system being continuously moved in a direction of an optical axis responsive to interaction between the cams and the follower members, and a plurality of parting lines generated on the plurality of cams in a molding process of the cam member, wherein a positional relationship of the cams, the follower members and the plurality of parting lines is set such that no two follower members are simultaneously positioned at the plurality of parting lines.

11. A lens barrel comprising:

a first barrel having a plurality of cam grooves, the first barrel being manufactured by molding a resin material, and the cam grooves having a parting line generated in a resin molding process; and a second barrel having a plurality of cam followers engaged with the plurality of cam grooves, respectively, such that rotation of one of the first barrel and the second barrel moves the other of the first barrel and the second barrel, wherein a positional relationship of the cam followers to the parting lines is set such that when one of the plurality of cam followers is positioned at the parting line of the cam groove with which the one of the plurality of cam followers is engaged, neither of the remaining cam followers are positioned at the parting lines of the cam grooves with which the remaining cam followers are engaged.

* * * * *

UNITED STATES PATENT AND TRADEMARK OFFICE
CERTIFICATE OF CORRECTION

PATENT NO.   : 5,777,802
DATED        : July 7, 1998
INVENTOR(S)  : Koiwai et al.

It is certified that error appears in the above-identified patent and that said Letters Patent is hereby corrected as shown below:

Col. 5, line 32, after "dent" insert --D--.

Col. 5, line 40, after "projection" insert --P--.

Col. 6, line 48, delete "2d" and insert --2c--.

Col. 8, line 5, after "long" insert --as--.

Col. 9, line 10, after "cams" insert --are--.

Signed and Sealed this

Eighth Day of June, 1999

Attest:

Q. TODD DICKINSON

Attesting Officer — Acting Commissioner of Patents and Trademarks